US009239779B2

(12) United States Patent
Sawaoka (10) Patent No.: US 9,239,779 B2
(45) Date of Patent: Jan. 19, 2016

(54) STORAGE DEVICE WHICH CAN PERFORM STABLE COMMUNICATION BETWEEN HOST AND STORAGE DEVICE, AND METHOD OF CONTROLLING THE SAME

(75) Inventor: Akira Sawaoka, Yokohama (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 120 days.

(21) Appl. No.: 13/602,488

(22) Filed: Sep. 4, 2012

(65) Prior Publication Data
US 2013/0238837 A1  Sep. 12, 2013

(30) Foreign Application Priority Data
Jan. 31, 2012  (JP) ................................. 2012-018761

(51) Int. Cl.
*G06F 12/00*  (2006.01)
*G06F 12/02*  (2006.01)
*G06F 3/06*  (2006.01)

(52) U.S. Cl.
CPC .......... *G06F 12/0246* (2013.01); *G06F 3/0613* (2013.01); *G06F 3/0656* (2013.01); *G06F 3/0679* (2013.01)

(58) Field of Classification Search
CPC .......................... G06F 3/0679; G06F 12/0238
USPC ........................................ 711/100, 103–105
See application file for complete search history.

(56) References Cited

U.S. PATENT DOCUMENTS

| 5,893,048 | A  | * | 4/1999  | Pate et al. ........................ 702/56 |
| 5,978,883 | A  | * | 11/1999 | Hanna ................................ 711/5 |
| 6,862,258 | B2 | * | 3/2005  | Kitagawa ...................... 369/53.3 |
| 8,812,807 | B2 | * | 8/2014  | Cho et al. ....................... 711/165 |
| 2011/0173376 | A1 | * | 7/2011 | Yuan et al. .................... 711/103 |

FOREIGN PATENT DOCUMENTS

| JP | 2006-40293 | 2/2006 |
| JP | 2007-11659 | 1/2007 |

OTHER PUBLICATIONS

U.S. Appl. No. 13/599,087, filed Aug. 30, 2012, Yonezawa, et al.
"Serial ATA International Organization: Serial ATA Revision 3.0", High Speed Serialized AT Attachment, Gold Revision, Jun. 2, 2009, 665 pages.

* cited by examiner

*Primary Examiner* — Tuan Thai
(74) *Attorney, Agent, or Firm* — Oblon, McClelland, Maier & Neustadt, L.L.P.

(57) ABSTRACT

According to one embodiment, a storage device includes a nonvolatile memory, an interface, a register, and a controller. The nonvolatile memory stores communication speed information. The interface communicates with a host. The register is included in the interface. The controller controls the nonvolatile memory and the interface. The controller reads the speed information from the nonvolatile memory and sets the speed information in the register when the device is started, and the interface communicates with the host based on the speed information set in the register.

20 Claims, 6 Drawing Sheets

F I G. 6

STORAGE DEVICE WHICH CAN PERFORM STABLE COMMUNICATION BETWEEN HOST AND STORAGE DEVICE, AND METHOD OF CONTROLLING THE SAME

CROSS-REFERENCE TO RELATED APPLICATIONS

This application is based upon and claims the benefit of priority from Japanese Patent Application No. 2012-018761, filed Jan. 31, 2012, the entire contents of which are incorporated herein by reference.

FIELD

Embodiments described herein relate generally to a storage device which uses serial ATA (interface specifications based on the Serial AT Attachment standard) (hereinafter referred to as SATA), such as an SSD (Solid-State Drive), and a method of controlling the storage device.

BACKGROUND

For example, communication protocols and the communication speed of SATA interfaces are determined by the SATA standard. SATA devices which use SATA interfaces, such as SSDs and hard disk devices, and hosts which use the devices are equipped with functions based on the SATA standard.

The SATA standard, however, includes parts which the vendors who develop the devices and the hosts can independently define, and a vague part which allows desired specifications. Therefore, when communication is performed between an SATA device and a host, the communication becomes unstable, and the communication may end in failure. In this case, the SATA device cannot be used. Since SATA devices are mainly used as storage devices, the fact that the SATA device cannot be used causes a large problem, since data cannot be stored in the storage device and data cannot be read from the storage device. Therefore, it is desired to enable stable communication between the host and the storage device.

DETAILED DESCRIPTION

In general, according to one embodiment, a storage device includes a nonvolatile memory, an interface, a register, and a controller. The nonvolatile memory stores communication speed information. The interface communicates with a host. The register is included in the interface. The controller controls the nonvolatile memory and the interface. The controller reads the speed information from the nonvolatile memory and sets the speed information in the register when the device is started, and the interface communicates with the host based on the speed information set in the register.

An embodiment will be explained hereinafter with reference to drawings.

First Embodiment

Figure 1:
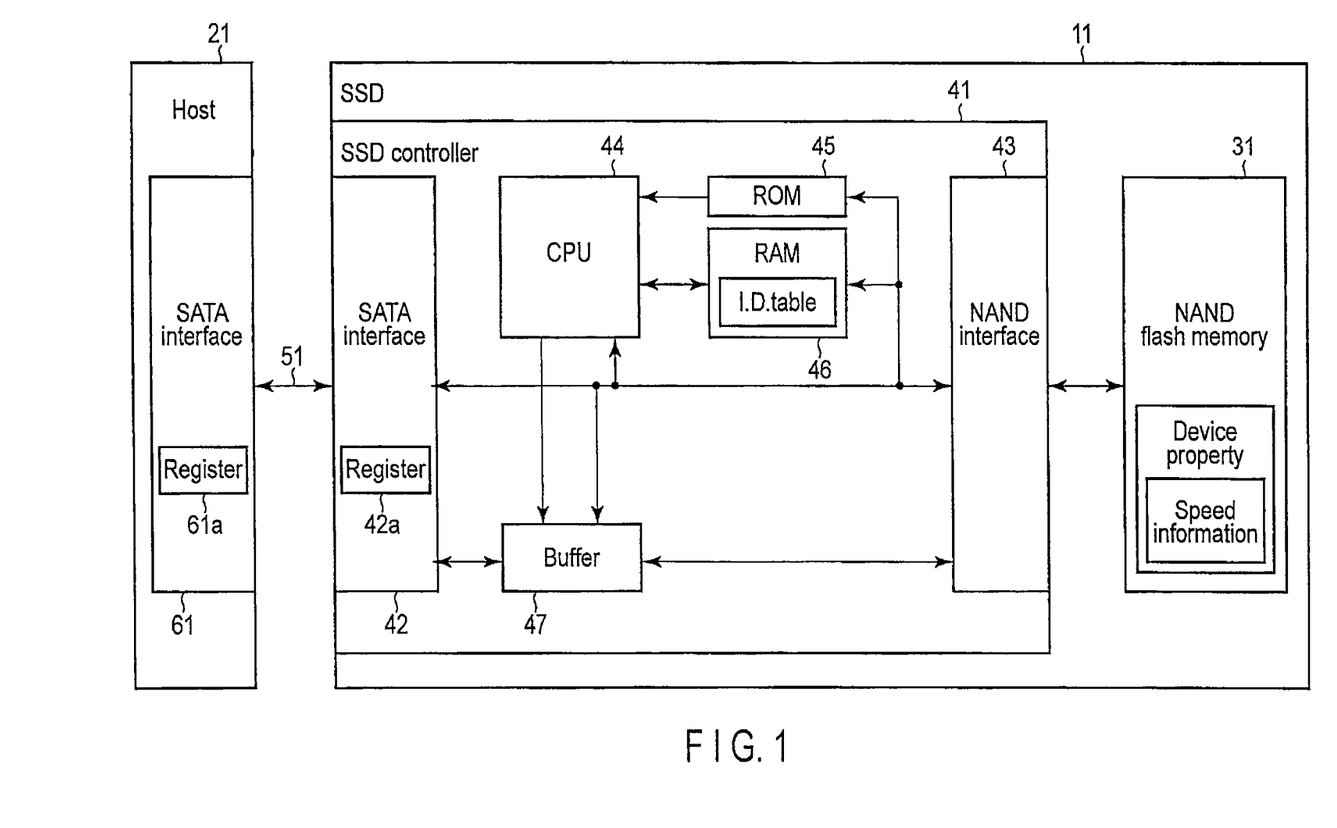
FIG. 1 is a block diagram of a storage device serving as an SATA device according to an embodiment.

FIG. 1 illustrates an SATA device to which a first embodiment is applied, and illustrates the case where the first embodiment is applied to, for example, an SSD.

An SSD 11 is connected to a host 21 by an SATA cable 51, and performs processing in accordance with access from the host 21. The host 21 is formed of, for example, a personal computer.

The SSD 11 includes a NAND flash memory 31 serving as a storage device, and an SSD controller 41.

The NAND flash memory 31 is formed of, for example, memory cells of a stacked gate structure, or memory cells of a MONOS structure. The NAND flash memory 31 stores, for example, user data, application software, and system software which uses the SSD as a storage region. In addition, the NAND flash memory 31 includes a device property region which stores property and information of the communication speed of the SATA device.

The SSD controller 41 is formed of, for example, an SATA interface 42, a NAND interface 43, a CPU 44, a ROM (Read Only Memory) 45, a RAM (Random Access Memory) 46, and a buffer 47.

The SATA interface 42 performs interface processing between the SDD controller 41 and the host 21, in accordance with the SATA specifications. The SATA interface 42 includes a register 42a which holds speed information described later. The NAND interface 43 performs interface processing between the SDD controller 41 and the NAND flash memory 31.

The CPU 44 manages control of the whole SSD 11. The CPU 44 accesses a region on the NAND flash memory 31, in response to a write (writing) command, a read (reading) command and an erase (erasing) command from the host 21, and controls data transfer processing through the buffer 47.

The ROM 45 stores firmware used by the CPU 44, such as an IPL (Initial Program Loader), a control program, a command processing module which processes commands, and an initialization processing module which initializes the device.

The RAM 46 is used as a work area of the CPU 44, and stores a control program and tables such as an Identify Device (I.D.) table. The Identify Device table includes information for identifying the SATA device, and speed information described later is also set in the Identify Device table.

The buffer 47 temporarily stores a certain amount of data when data transmitted from the host 21 is written in, for example, the NAND flash memory, and temporarily stores a certain amount of data when data which is read out from the NAND flash memory 31 is transmitted to the host 21.

The host 21 includes a CPU, a memory (which are not shown), and an SATA interface 61. The SATA interface 61 performs interface processing between the host 21 and the SDD controller 41, in accordance with the SATA specifications. The SATA interface 61 includes a register 61a which holds the speed information described later.

Figure 2:
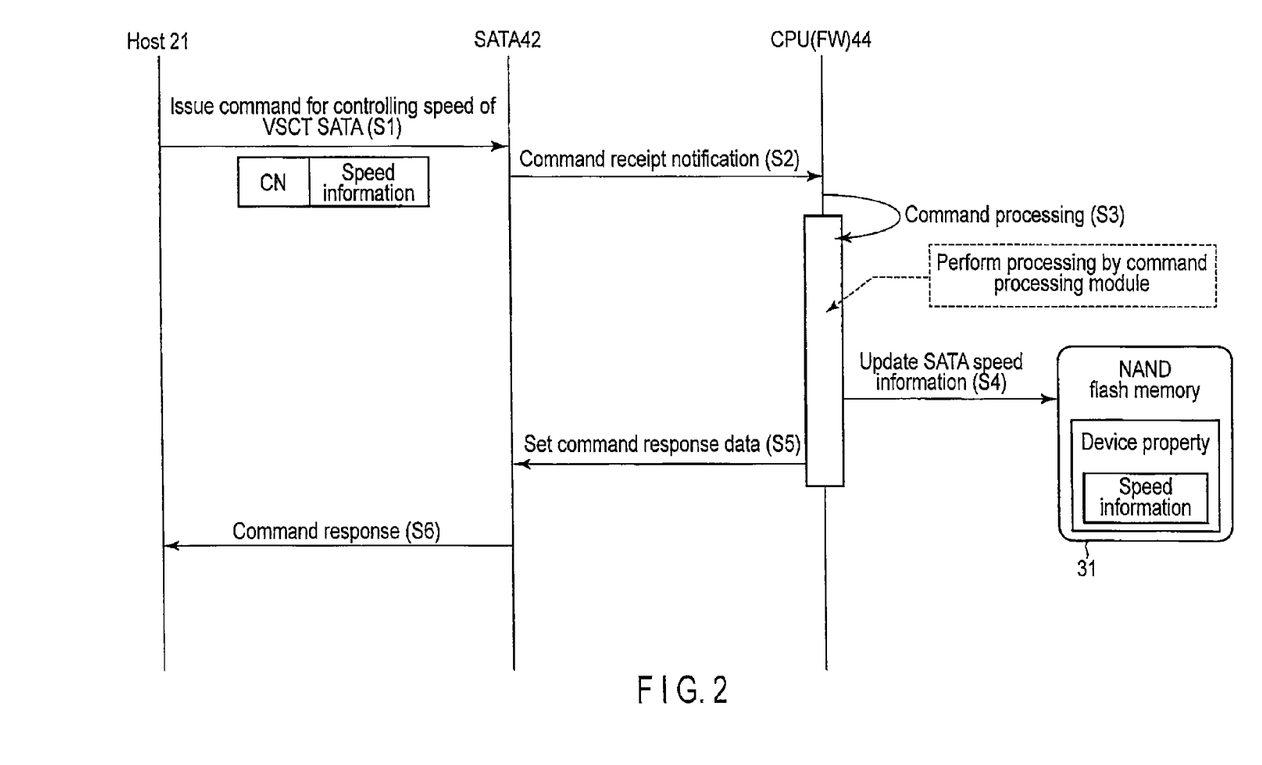
FIG. 2 is a diagram for explaining an operation of setting speed information according to the embodiment.

FIG. 2 illustrates an operation performed when speed information for setting the communication speed is updated in the SATA device according to the present embodiment.

Generally, speed negotiation is performed when an SATA device communicates with the host, and the speed at which communication can be performed is set in the SATA device and the host. However, the speed negotiation may be unstable or end in failure, when communication is performed between the SATA device and the host.

Therefore in the present embodiment, first, a command which includes communication speed information is transmitted from the host 21 to the SSD 11, and the speed information is stored in the NAND flash memory 31 of the SSD 11, based on the command. The speed information can be set, for example, by the manufacturer when the SATA device is manufactured, or by the user after shipping.

Specifically, as illustrated in FIG. 2, for example, when the SATA device is manufactured, a command for setting the communication speed of the SATA device is issued from the host 21 (S1), in a state where negotiation is established at a preset communication speed between the SATA interface 42a of the SSD 11 and the SATA interface 61a of the host 21. The command is formed of a command name (CN) for identifying the command, and speed information serving as data. The speed information is speed information which is supported by the host 21.

When the command which is output from the host 21 is received by the SATA interface 42 of the SSD 11 through the SATA cable 51, the SATA interface 42 notifies the CPU 44 of receipt of the command (S2).

The CPU 44 processes the received command by the command processing module, in accordance with the notification (S3). Specifically, the command name is recognized, and the speed information included in the command is written in the NAND flash memory 31 through the NAND interface 43 (S4). Specifically, the speed information is stored in the device property region of the NAND flash memory 31.

When the speed information is stored in the device property region of the NAND flash memory 31, the CPU 44 supplies the SATA interface 42 with a command response which includes information that indicates that setting of the speed information was normally finished (S5).

The SATA interface 42 transmits the command response to the host 21 through the SATA cable 51 (S6).

As described above, the communication speed information is set in the SSD 11 serving as the SATA device.

It is also possible to issue the command by the user and change the speed information that is stored in the device property region of the NAND flash memory, after the product is shipped. For example, after the product is shipped, the speed information used when the negotiation is established at the first startup may be stored in the NAND flash memory. Thereby, negotiation is started based on the speed information that is stored in the NAND flash memory, in the next and later startups.

Figure 3:
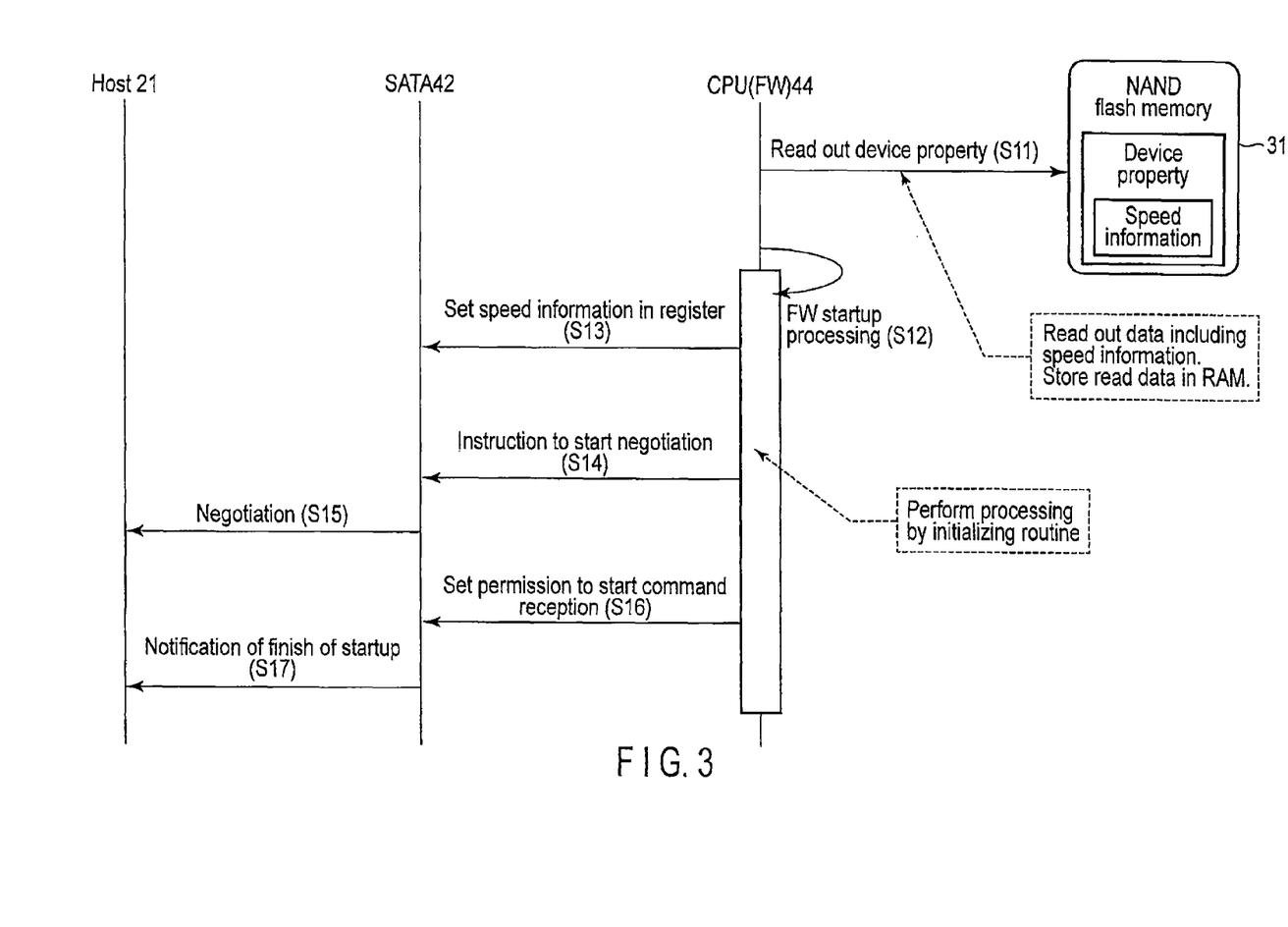
FIG. 3 is a diagram for explaining an operation performed when the storage device illustrated in FIG. 1 is started.

FIG. 3 illustrates an operation which is performed when the SATA device is started.

When the power of the SSD 11 is turned on, the CPU 44 reads out the control program, the command processing module which processes commands, and the initialization processing module which initializes the device from the ROM 45 by the IPL, and the program and the modules are loaded into the RAM 46. In addition, the IPL accesses the device property region of the NAND flash memory 31 through the NAND interface 43, and information such as properties and the speed information, which are stored in the device property region, are read out (S11). The read information, such as properties and the speed information, are stored in the RAM 46.

Thereafter, for example, the initialization processing module executes startup of the SSD 11 (S12). Specifically, the speed information which is stored in the RAM 46 is supplied to the register 42a of the SATA interface 42, and held in the register 42a (S13).

Next, the CPU 44 instructs the SATA interface 42 to start negotiation (S14).

Figure 4:
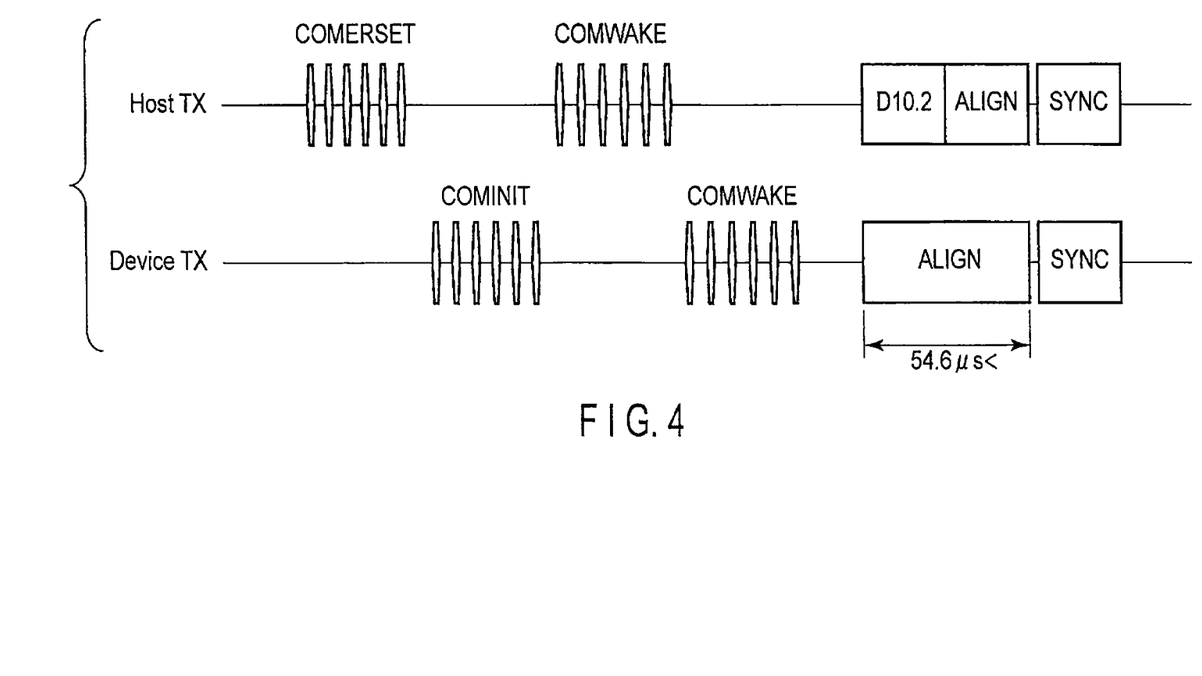
FIG. 4 is a timing chart for explaining a negotiation operation between the host and the storage device.

As illustrated in FIG. 4, the SATA interface 42 executes an initializing sequence using, for example, an OOB (Out Of Band) signal, based on the instruction to start negotiation. Specifically, the SATA interface 61 of the host 21 transmits a signal COMRESET which is formed of presence/absence of six signals. When the SATA interface 42 receives the signal COMRESET, the SATA interface 42 transmits a signal COMINIT. When the SATA interface 61 of the host 21 receives the signal COMINIT, the SATA interface 61 transmits a signal COMWAKE. When the SATA interface 42 of the SSD 11 receives the signal COMWAKE from the host 21, the SATA interface 42 transmits a signal COMWAKE to the host 21. The signals COMRESET, COMINIT, and COMWAKE are different from each other in a period in which no signals exist (Idle period).

When the SATA interface 61 of the host 21 receives the signal COMWAKE from the SSD 11, the SATA interface 61 transmits, for example, a signal D 10.2. Serial communication which is used in the SATA device transmits only data, and the clock of the transmitting side is not transmitted to the receiving side. Therefore, it is necessary for the receiving side to generate a reception clock by any means. The signal D 10.2 is a signal which includes a line of 10 bits of numbers "01 . . . 0101 . . . 0101", in which "0" alternates with "1". The period of the signal D 10.2 agrees with the period of the transmission clock of the transmitting side. When the SATA interface 42 of the SSD 11 receives the signal D 10.2, the SATA interface 42 generates a clock signal based on the signal D 10.2.

In addition, the SATA interface 42 of the SSD 11 transmits a data pattern called ALIGN to the host 21, based on the speed information which is held in the register 42a, and waits for ALIGN transmitted from the host 21 for 54.6 μs or the like.

The SATA interface 61 of the host 21 outputs the signal D 10.2, until the SATA interface 61 detects ALIGN of a speed which the SATA interface 61 supports. When the SATA interface 61 detects ALIGN of the speed which the SATA interface 61 supports, the SATA interface 61 transmits a data pattern ALIGN at the same speed to the SSD 11. Specifically, when the SATA interface 61 detects a data pattern ALIGN which is transmitted from the SATA interface 42 of the SSD 11 and has the speed supported by the SATA interface 61, the SATA interface 61 holds the speed information of the ALIGN in the register 61a, and transmits a data pattern ALIGN to the SSD 11 based on the held speed information.

When the SSD 11 and the host 21 detect the data pattern ALIGN of the same speed as the speed used in the SSD 11 and the host 21, a data pattern called SYNC is transmitted from each of the SSD 11 and the host 21. The negotiation is finished in this state. The communication speed established by the negotiation is held in the registers 42a and 61a until the power of the SSD 11 or the host 21 is turned off.

After the negotiation is completed, it is set in the SATA interface 42 from the CPU 44 of the SSD 11 that command reception can be started (S16), as illustrated in FIG. 3. Based on the setting, the SATA interface 42 notifies the host 21 that startup is completed (S17).

Thereafter, information can be transmitted and received between the SSD 11 and the host 21, at the above established communication speed.

Figure 5:
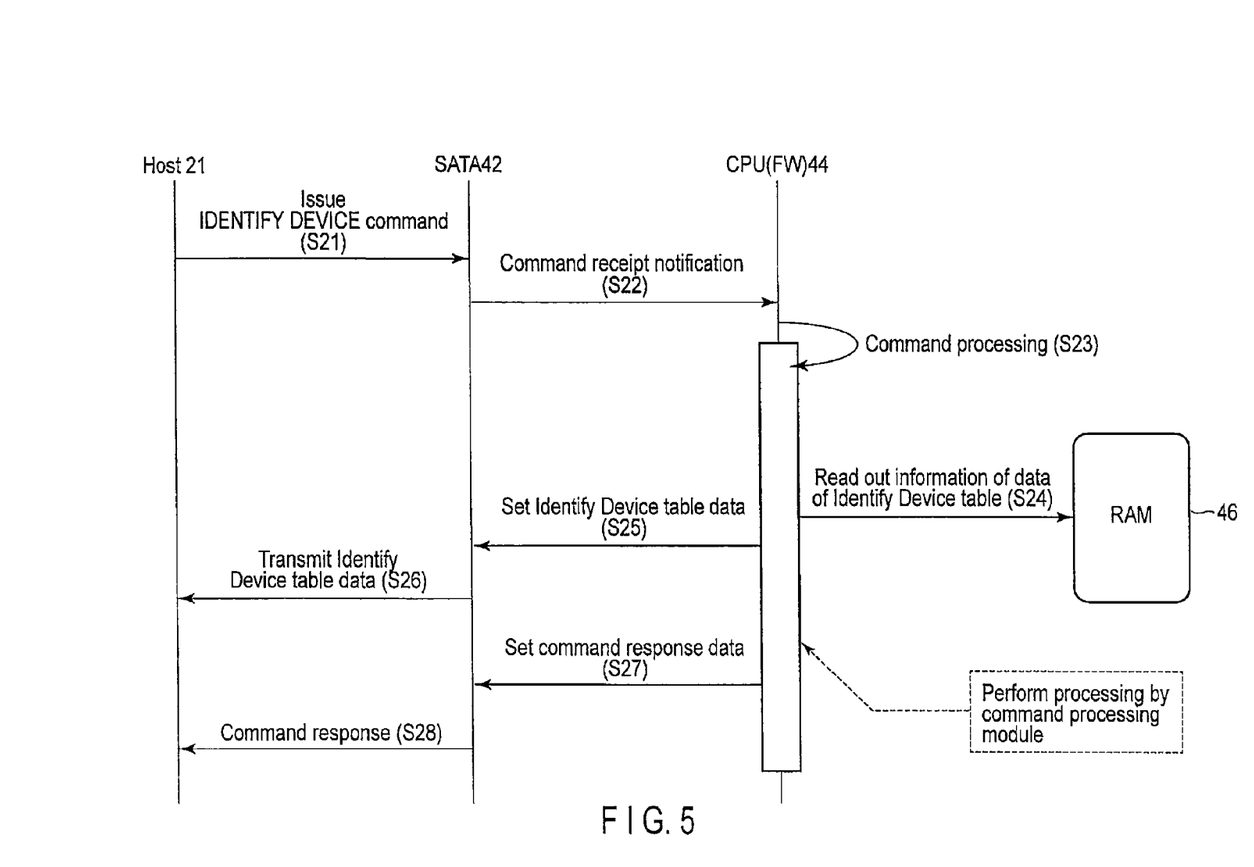
FIG. 5 is a diagram for explaining an operation of checking the speed information stored in the storage device.

FIG. 5 illustrates an operation performed when the communication speed of the operating SATA is checked by the host 21. The register 61a of the SATA interface 61 of the host 21 holds the communication speed. The host 21 is not configured, however, to access the register 61a. Therefore, the host 21 reads out the communication speed from the SATA device by using a preset command, and checks the communication speed.

Specifically, the host 21 issues an IDENTIFY DEVICE command (S21), when the host 21 checks the communication speed of the operating SATA. The command is a command to read out an IDENTIFY DEVICE table which is stored in, for example, the RAM 46.

When the SATA interface 42 receives the IDENTIFY DEVICE command, the SATA interface 42 notifies the CPU 44 that the IDENTIFY DEVICE command was received (S22).

The CPU 44 analyzes and processes the received command, by the command processing module (S23).

Specifically, the CPU 44 reads out data of the Identify Device table in the RAM 46 (S24), based on the IDENTIFY DEVICE command.

The Identify device table stores the speed information which is read from the NAND flash memory 31. The CPU 44 supplies the Identify Device table which includes the speed information to the SATA interface 42 (S25).

The SATA interface 42 transmits the supplied Identify Device table to the host 21 (S26).

Thereafter, the CPU 44 sets data, which indicates that the IDENTIFY DEVICE command was normally finished, in the SATA interface 42 (S27).

The SATA interface 42 transmits the set data as a command response to the host 21 (S28).

By the above operation, the host 21 can check the speed information of the SATA device, based on the speed information which is included in the Identify Device table.

According to the above embodiment, the SSD 11 stores the speed information of communication with the SATA device, which is supported by the host 21, in the NAND flash memory 31. When the SSD 11 is started, the SSD 11 reads out the speed information stored in the NAND flash memory 31, and sets the speed information in the register 42a of the SATA interface 42. In the negotiation with the host 21, the SSD 11 transmits ALIGN to the host 21, based on the speed information that is set in the register 42a. In addition, since the speed information of the ALIGN received by the host 21 is the same as the speed information supported by the host 21, the host 21 transmits a data pattern ALIGN to the SATA device based on the speed information, and thereby the negotiation can be completed. Since the ALIGN is transmitted to the host 21 from the SSD 11 at the speed supported by the host 21, the host 21 can promptly transmit ALIGN at the same speed, and can complete the negotiation. Therefore, it is possible to securely perform the SATA speed negotiation for a short time. It is thus possible to prevent communication between the host 21 and the SSD 11 from becoming unstable, and maintain stable writing and reading operations of the SSD 11.

The present embodiment is compared hereinafter with a common SATA speed negotiation illustrated in FIG. 6. The negotiation operation illustrated in FIG. 6 is an operation performed after COMWAKE signals are transmitted from the host and the SATA device.

Figure 6:
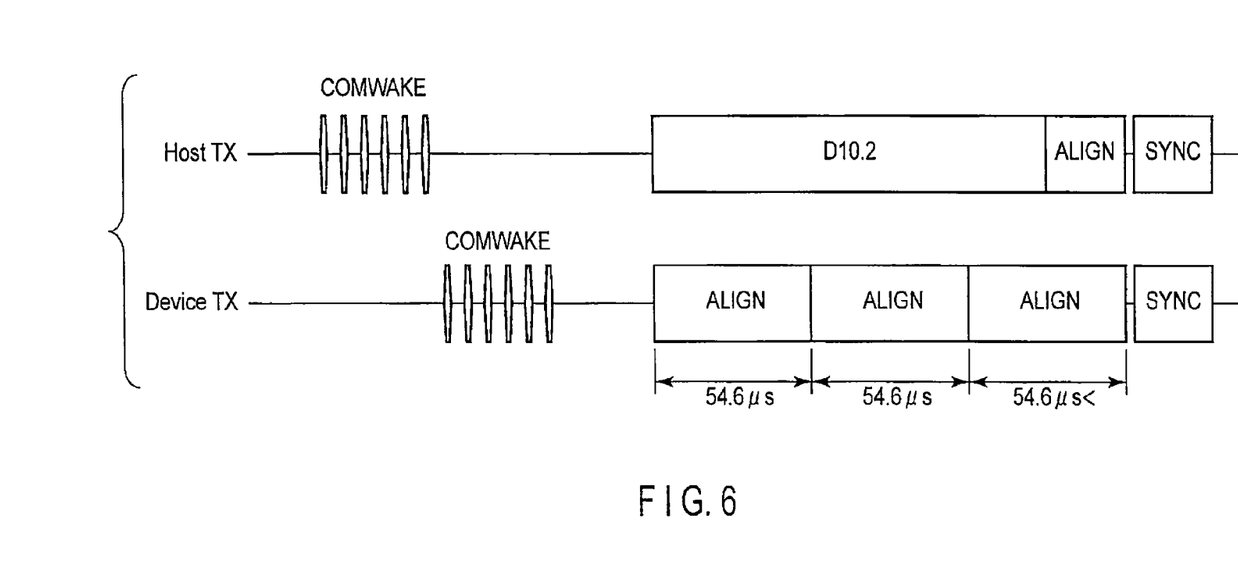
FIG. 6 is a timing chart of a comparative example of the negotiation operation.

In the common negotiation illustrated in FIG. 6, after a signal D 10.2 is transmitted from the host, a data pattern ALIGN is transmitted from the SATA device at, for example, the maximum speed of the device. Specifically, since the SATA device cannot obtain the speed supported by the host, the SATA device transmits the ALIGN at the maximum speed of the SATA device first. The SATA device waits for transmission of ALIGN at the same speed from the host for 54.6 µs which is the preset time. The SATA device transmits ALIGN again at a reduced speed, when no ALIGN is transmitted from the host after the preset time has passed. This operation is performed until ALIGN is transmitted from the host.

As described above, when the SATA device cannot obtain the speed information supported by the host, the SATA device is required to attempt transmission of ALIGN from the maximum speed supported by the SATA device each time the SATA device is started, and the negotiation requires much time. In comparison with this, according to the present embodiment, the speed information supported by the host is stored in the NAND flash memory 31 of the SATA device, and thus the speed information is held in the NAND flash memory 31 even after the power is turned off. Therefore, after the power of the SATA device is turned on, negotiation is started based on the speed information, and thus negotiation can be executed quickly and securely.

In addition, according to the above embodiment, a command to change the speed information is issued from the host 21, and thereby the speed information stored in the device property region of the NAND flash memory can be changed. Therefore, even when the host to which the SATA device is connected is changed, it is possible to change the speed information in accordance with the specifications of the host connected with the SATA device, and execute negotiation quickly and securely.

The above embodiment shows the case where the embodiment is applied to an SSD serving as an SATA device. The embodiment is not limited to SSDs, however, but may be applicable to hard disks or the like.

In addition, the present embodiment is not limited to SATA devices, but is applicable to SATA controllers, interface controllers, SASs (Serial Attached SCSI), and PCIs (Programmable Communications Interface).

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A storage device comprising:
   a nonvolatile memory;
   a volatile memory; and
   a controller configured to control the nonvolatile memory and the volatile memory,
   wherein the controller stores, when a first command is issued from a host, communication speed information in the nonvolatile memory, the first command including the communication speed information,
   the controller controls to store the communication speed information that is stored in the nonvolatile memory into the volatile memory, and
   the controller reads the communication speed information that is stored in the volatile memory and transmits the read communication speed information when a second command is issued from the host.

2. The device according to claim 1, wherein the communication speed information is communication speed information that is supported by the host.

3. The device according to claim 1, wherein the nonvolatile memory is a NAND flash memory.

4. The device according to claim 3, wherein
the volatile memory is a random access memory.

5. The device according to claim 1, further comprising:
an interface configured to communicate with the host at a speed based on the communication speed information.

6. The device according to claim 5, wherein
when the storage device is restarted,
the controller, in startup, reads out the communication speed information that is stored in the nonvolatile memory, stores the communication speed information, which is read from the nonvolatile memory, in the volatile memory, and sets the communication speed information, which is stored in the volatile memory, in a register, and
the interface communicates with the host based on the communication speed information stored in the register.

7. The device according to claim 6, wherein
the interface includes a register,
the controller stores the communication speed information in the register, and
the interface communicates with the host in accordance with the communication speed information that is stored in the register.

8. The device according to claim 5, wherein
the interface is at least one of a serial ATA, SAS (Serial Attached SCSI), and PCI (Programmable Communications Interface).

9. A method of controlling a storage device, comprising:
storing, when a first command is issued from a host, communication speed information in a nonvolatile memory, the first command including the communication speed information;
storing the communication speed information which is stored in the nonvolatile memory into a volatile memory;
reading the communication speed information which is stored in the volatile memory, when a second command is issued from the host; and
transmitting the read communication speed information.

10. The method according to claim 9, wherein
the communication speed information is communication speed information which is supported by the host.

11. The method according to claim 9, wherein
when the storage device is restarted,
reading the communication speed information that is stored in the nonvolatile memory in startup, and
communicating with the host based on the communication speed information that is read from the nonvolatile memory.

12. The method according to claim 11, wherein
storing the communication speed information in a register, and
communicating with the host in accordance with the communication speed information that is stored in the register.

13. The method according to claim 9, wherein
the nonvolatile memory is a NAND flash memory.

14. The method according to claim 9, further comprising communicating with the host at a speed, based on the communication speed information.

15. The method according to claim 14, wherein
the communicating with the host uses at least one of a serial ATA, SAS (Serial Attached SCSI), and PCI (Programmable Communications Interface).

16. A storage device comprising:
a nonvolatile memory configured to store communication speed information;
a volatile memory configured to store the communication speed information that is read from the nonvolatile memory;
an interface configured to communicate with a host;
a register which is provided in the interface; and
a controller configured to control the nonvolatile memory and the interface,
wherein the controller reads the communication speed information from the nonvolatile memory in startup, and sets the communication speed information in the register,
the interface communicates with the host based on the communication speed information that is set in the register,
the controller reads the communication speed information that is stored in the volatile memory, when a second command is issued from the host, and
the interface transmits the communication speed information that is read from the volatile memory to the host.

17. The device according to claim 16, wherein
the communication speed information is communication speed information that is supported by the host.

18. The device according to claim 16, wherein
the interface is at least one of a serial ATA, SAS (Serial Attached SCSI), and PCI (Programmable Communications Interface).

19. The device according to claim 16, wherein
the nonvolatile memory is a NAND flash memory.

20. The device according to claim 19, wherein
the volatile memory is a random access memory.

* * * * *